United States Patent [19]

Wagner

[11] Patent Number: 4,836,093
[45] Date of Patent: Jun. 6, 1989

[54] PISTON ASSEMBLY

[75] Inventor: Daniel G. Wagner, Etna, Pa.

[73] Assignee: American Standard Inc., Wilmerding, Pa.

[21] Appl. No.: 881,757

[22] Filed: Jul. 3, 1986

Related U.S. Application Data

[63] Continuation of Ser. No. 642,277, Aug. 20, 1984, abandoned.

[51] Int. Cl.$^4$ ............................................. F01B 31/10
[52] U.S. Cl. ...................................... 92/160; 92/187; 92/235; 123/193 P
[58] Field of Search ................. 92/158, 160, 187, 234, 92/235, 236, 159; 123/DIG. 7, 14.35, 193 P

[56] References Cited

U.S. PATENT DOCUMENTS

| | | | |
|---|---|---|---|
| 866,443 | 9/1907 | Dyer | 92/159 |
| 878,783 | 2/1908 | Downie | 92/159 |
| 1,432,799 | 10/1922 | Stackhouse | 92/160 |
| 1,489,767 | 4/1924 | Kroschinsky | 92/159 |
| 1,804,873 | 5/1931 | Hoffman | 123/DIG. 7 |
| 2,409,852 | 10/1946 | Harrah | 92/160 |
| 2,621,092 | 12/1952 | Clark | 92/160 |
| 2,653,065 | 9/1953 | Appleton | 92/160 |
| 2,695,824 | 11/1954 | Klingel, Jr. | 92/160 |
| 2,742,883 | 4/1956 | Smith | 92/159 |
| 2,753,231 | 7/1956 | Nallinger | 92/160 |
| 2,921,823 | 1/1960 | Kestler | 92/160 |
| 3,521,531 | 7/1970 | Kaesemedel | 92/160 |
| 3,564,978 | 2/1971 | Flitz | 92/187 |
| 4,068,563 | 1/1978 | Ryan | 92/157 |
| 4,210,062 | 7/1980 | Plesko | 123/DIG. 7 |
| 4,522,163 | 6/1985 | Hooper | 123/193 P |

FOREIGN PATENT DOCUMENTS

| | | | |
|---|---|---|---|
| 2321420 | 11/1973 | Fed. Rep. of Germany | 123/193 P |
| 170840 | 10/1983 | Japan | 123/193 P |
| 258769 | 12/1969 | U.S.S.R. | 123/193 P |
| 791983 | 1/1981 | U.S.S.R. | 123/193 P |

Primary Examiner—Abraham Hershkovitz
Attorney, Agent, or Firm—J. O. Ray, Jr.

[57] ABSTRACT

A piston assembly is disclosed which reduces the consumption of a lubricating agent circulated to provide lubrication between the outer sidewall of the piston assembly and the interior sidewall of a bore. This is accomplished by providing at least one aperture in at least one compression ring groove. The aperture is disposed in fluid communication with the interior of a hollow skirt portion of the piston for communicating such lubricating agent gathered in the compression ring groove into the interior of the hollow skirt portion of the piston so that the lubricating agent can return to the crankcase of an operating mechanism.

27 Claims, 2 Drawing Sheets

PISTON ASSEMBLY

This is a continuation of application Ser. No. 642,277, filed Aug. 20, 1984, now abandoned.

BACKGROUND OF THE INVENTION

The present invention relates in general to pistons and, more particularly, the invention relates to a piston assembly which reduces the consumption of a lubricating agent circulated to provide lubrication between the outer sidewall of such piston assembly and the interior sidewall of a bore in which such piston assembly is mounted for reciprocal movement. The volume of a lubricating agent such as oil that passes the compression rings and eventually works its way to the top surface of the piston head is normally controlled through different ring designs and ring loadings against the adjacent cylinder walls. Because such lubricating agent is normally oil, an oil ring is provided on the outer surface of the piston which serves the purpose of coating the cylinder wall with an oil film. The compression ring or rings are provided in order to seal the variable volume chamber to prevent the fluid, which is either compressed or combusted, from entering the crankcase. In addition, the compression rings supposedly will scrape away the lubricating oil that has been wiped into the cylinder sidewall by the oil ring or rings.

It was believed that this configuration would normally provide satisfactory oil passing in a fluid compressor, for example, however, it has been found to be less than satisfactory under a variety of conditions of operations in certain types of fluid compressor exhausters. It had been thought up until the present time that passing of such lubricating oil could be controlled in an efficient manner through the use of a vacuum maintaining valve in the system in order to maintain a crankcase volume of between about 20 to 21 inches of Hg. vacuum. This was believed to be very sound reasoning because the pressure differential would always be toward the crankcase. Nevertheless, review of a number of oil passing tests that have been conducted over an extended period of time and under a number of operating conditions have shown a sensitivity to the main reservoir vacuum which will influence the maximum level of crankcase vacuum that can be achieved and also determines the magnitude of the pressure differential that is developed across the compression rings.

Furthermore, the inspection of a number of vacuum cylinders in current ongoing production tests have likewise shown that an excessive amount of lubricating oil is being carried past the compression rings to the top surface of the piston. In some of the more severe cases, rather large puddles of oil have been observed on the top surface of the vacuum pistons in the fluid compressor. The observation suggests that all of the oil that is being passed does not pass by the sealing surface of the compression ring as one would expect but such ol may possibly migrate behind the compression ring until such time as it enters the top of the piston and is forced out through the valves to the atmosphere. In any event, this situation can not be tolerated because the characteristically high oil passage on such vacuum cylinders serves to increase the maintenance requirements in view of the fact that the oil will cause carboning of the valves under a high discharge temperature condition. When carboning of the valve occurs, which has sometimes been reported in as short a period as three months, the compressor must be taken out of service so that the valves can be cleaned.

SUMMARY OF THE INVENTION

The present invention teaches a piston assembly for reducing the consumption of a lubricating agent circulated to provide lubrication between the outer sidewall of said piston assembly and the interior sidewall of a bore, which bore in combination with the piston assembly forms a variable volume fluid chamber of an operating mechanism, during reciprocal movement of the piston assembly within such bore. The piston assembly comprises a piston having a head portion disposed at one end of the piston to form a boundary of such variable volume fluid chamber. A hollow skirt portion is provided adjacent the head portion for maintaining the piston assembly in substantial axial alignment with the interior sidewall of such bore of the operating mechanism during reciprocal movement of the piston assembly.

At least one annular lubricating groove is formed in the outer sidewall of the piston for receiving and retaining therein a lubrication control ring.

The annular lubricating groove includes a first aperture disposed in fluid communication with the interior of the hollow skirt portion for communicating the lubricating agent gathered in the lubricating groove into the interior of the hollow skirt portion so that such lubricating agent can return to a crankcase of the operating mechanism through an open end of the hollow skirt portion of the piston.

At least one annular compression ring groove is formed in the outer sidewall of the piston intermediate the at least one annular lubricating groove and the head portion for receiving and retaining therein a compression ring.

A compression ring is disposed in the annular compression ring groove for sealing the piston assembly against such interior sidewall of the bore of such variable volume fluid chamber.

The compression ring groove also includes a second aperture disposed in fluid communication with the interior of the hollow skirt portion for communicating such lubricating agent gathered in the compression ring groove into the interior of the hollow skirt portion so that such lubricating agent can return to the crankcase of such operating mechanism through the open end of the hollow skirt portion of said piston.

OBJECTS OF THE INVENTION

It is threfore the primary object of the present invention to provide a piston having improved control with respect to the volume of lubrication medium that is allowed to pass the compression ring of such piston.

Another object of the present invention is to provide a piston that will require less maintenance due to carbon buildup on the piston crown and discharge valves from excess oil passing the compression ring.

These and various other objects and advantages of the present invention will become more readily apparent to those persons skilled in the piston design art from the following detailed description when such description is taken in conjunction with the attached drawings.

BRIEF DESCRIPTION OF THE VARIOUS EMBODIMENTS OF THE INVENTION

Figure 1:
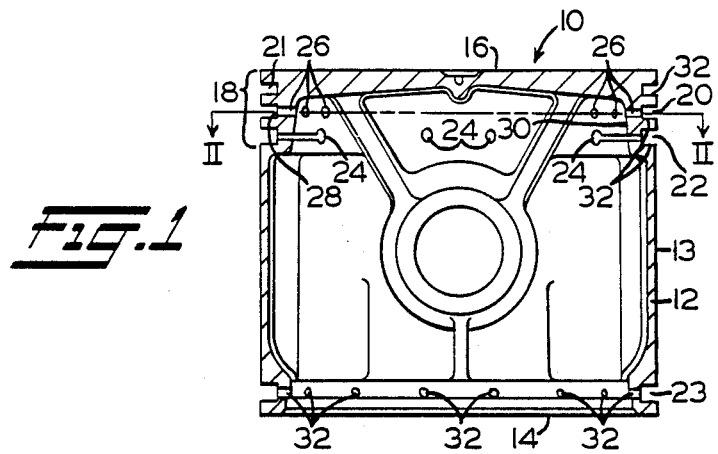
FIG. 1 is a side elevation view of a working piston incorporating one embodiment of the present invention shown without the compression rings and oil ring being in place.
Figure 2:
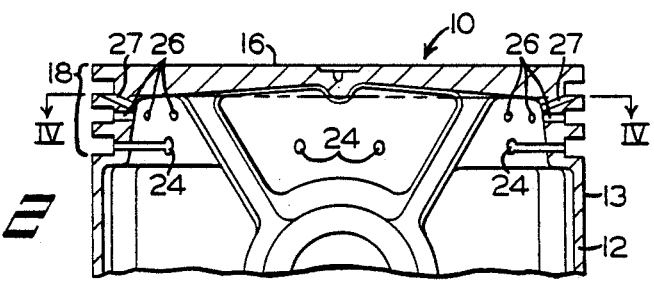
FIG. 2 is a fragmented side elevation view of a working piston incorporating an alternative embodiment of the present invention and is also shown without the compression rings and oil ring being in place.

When referring to the drawings, identical parts have been identified with identical numbers throughout the several views.

Although it is not limited thereto, the invention is particularly well suited for use on an air compressor and also when the lubricating medium is oil. Accordingly, the invention will be described as an air compressor working piston lubricated by an oil film. Now refer more particularly to the drawings for an understanding of the piston of the present invention as used in a fluid compressor and which piston provides an improvement in the control of the volume of a lubrication oil that is allowed to pass the compression ring of the working piston.

As shown in the drawings, the air compressor piston, generally designated 10, comprises in one form of the invention, a reciprocally movable, generally cylindrical hollow piston skirt portion 12 which maintains the piston 10 in substantial alignment with a cylindrical bore or sidewall (not shown) of the air compressor variable volume fluid chamber (not shown). The piston skirt 12, among other things to be described hereinafter, insures more or less uniform and complete contact between the faces of the compression and oil rings (neither of which are shown) and the sealing surface (not shown) of the cylinder sidewall Furthermore, the piston skirt 12 may have a number of differing configurations as are known in the art.

The piston skirt 12 is open at one end 14 thereof for the reasons which will become clear hereinafter and include a piston crown or head 16 disposed on the other end of the piston skirt 12. The piston head 16 which forms one boundry of the compressor variable volume fluid chamber may be substantially flat on its outer surface or the head 16 may have some predetermined contour which will serve the purpose of compressing the air during a compression stroke on the piston 10 in the air compressor.

On the outer surface 13 of the piston 10 adjacent the piston head 16 end is a plurality of piston ring grooves generally designated 18. The piston ring grooves 18 are the recesses into which the piston rings (not shown) are carried to seal the piston against gas pressures. At least one compression ring groove is provided and is the annular recess engaging the compression ring. Oil ring groove 22 is provided and is the annular recess engaging the oil control rings; this groove 22 is generally perforated with a first plurality of (drill) holes 24 provided therein to permit draining of the oil gathered in the groove by the scavenging action of the oil ring. The piston ring grooves 18 in combination with the piston rings, provide a means of sealing the piston 10 to block escape of the fluid being compressed and control the circulation of lubricating oil about the piston 10. Some designs employ an oil ring groove (not shown) below the piston pin bosses.

Figure 3:
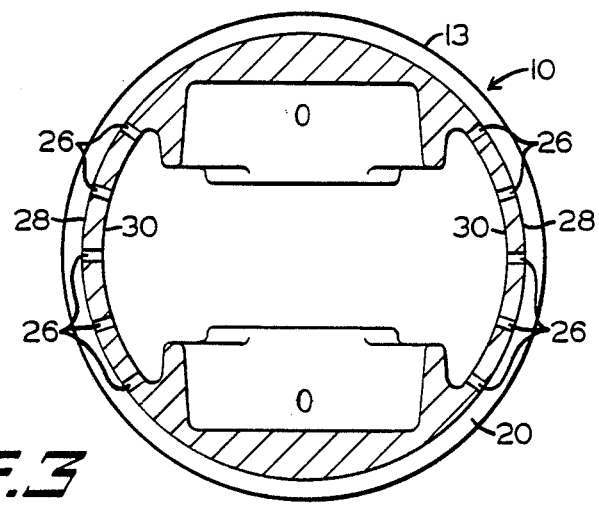
FIG. 3 is a cross-sectional view taken along lines III—III of the working piston shown in FIG. 1.
Figure 4:
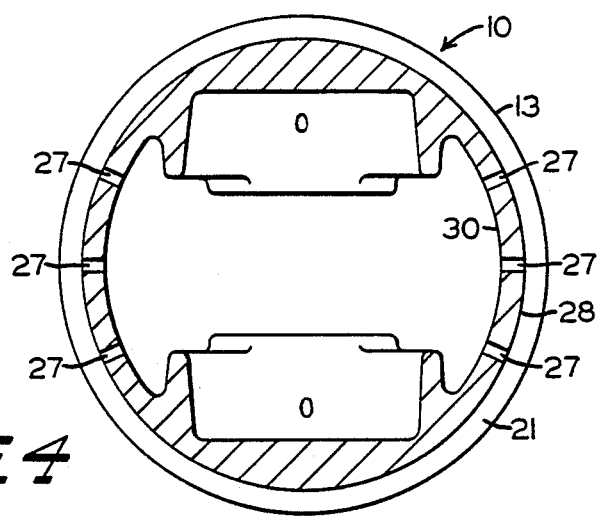
FIG. 4 is a cross-sectional view taken along lines IV—IV of the working piston shown in FIG. 2.
Figure 6:
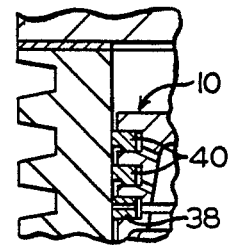
FIG. 6 is a fragmented cross-sectional view showing an alternative compression ring groove aperture.

According to the present inventin, the compression ring groove 20 is also provided with a second plurality of drill holes 26 are apertures which preferrably begin at the rear surface 28 of the compression ring groove 20 and terminates on the inside surface 30 (FIG. 3) of the hollow piston skirt 12 to drain any excess oil into such inside surface 30 of the piston skirt 12 and thereby control the volume of lubricating oil that is allowed to pass a compression ring of the piston 10. The second plurality of apertures 26 have both a predetermined size and spacing therebetween.

The piston 10 also includes a plurality of piston ring lands 32 which are the ledges of the piston ring grooves 18 that form the contact between the piston 10 and the piston rings. The lands 32 provide a seating surface for the piston rings to form a seal to prevent passage of the gas pressure behind the piston rings.

Having now described the basic invention, various preferred and alternatives thereto will be described. For example, if the piston 10 is in a vertical position during operation, it is preferred that the plurality of apertures 26 in the at least one annular compression ring groove 20 be distributed equally on each side of the piston assembly about a predetermined center line.

Furthermore, the at least one annular compression ring groove 20 will have at least three apertures 26 on each side of the predetermined center line and the two outer apertures will be spaced substantially equidistant from the center aperture on each side.

On the other hand, if the piston 10 is in a slanted position during operation, it is preferred that the at least one annular compression ring groove 20 will have a greater number of the apertures 26 on the low side of the piston 10 center line than on the opposed side.

In addition, the greater number of said apertures 26 on the low side of said predetermined center line will be spaced substantially equidistant from each other.

Figure 5:
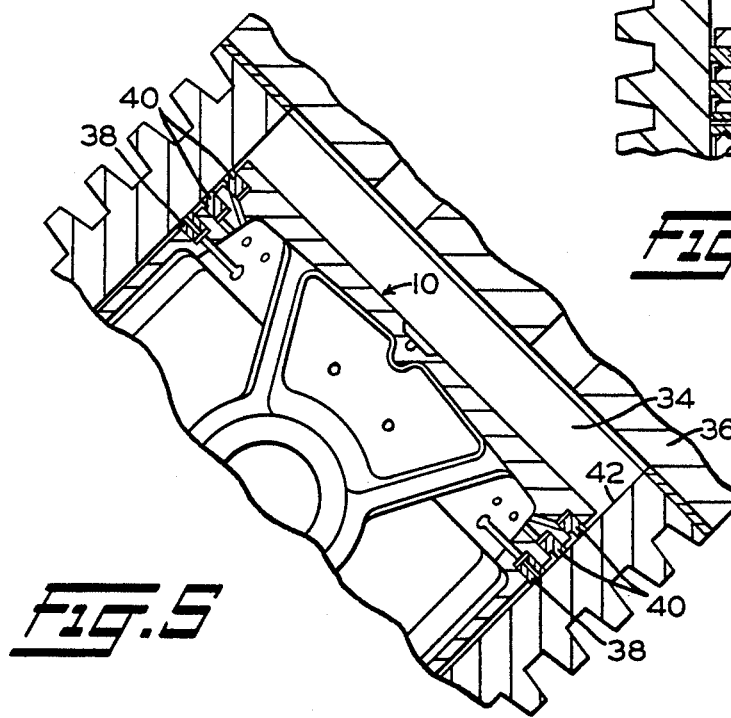
FIG. 5 is a fragmented cross-sectional view showing a piston constructed according to the invention positioned in a slanted bore of an air compressor.

In FIG. 5 the piston 10 is shown in a slanted bore 34 of an air compressor 36. In this view, a lubricating oil ring 38 and compression rins 40 are also shown in contact with a wall 42 of the slanted bore 34.

In the presently contemplated preferred embodiment of the invention, the at least one annular lubricating groove 22 and the at least one annular compression ring groove 20 have a cross-sectional area that is substantially rectangular and the back wall of said rectangular groove is substantially parallel to the outer sidewall 13 of said piston 10.

The plurality of apertures 26 in the at least one annular compression ring groove 20 may be formed through the sidewall 13 of the piston 10 substantially perpendicular to a longitudinal center line of the piston 10 and have one end of the apertures 26 terminate at the inner surface 30 of the hollow skirt portion 12.

The plurality of apertures 26 in at least one annular compression ring groove 30 may also be formed through the sidewall 13 of the piston 10 at an angle and have one end of the aperture 26 terminate at the bottom wall or land 32 of the rectangular groove 20 and the other end terminate at the inner surface 13 of the hollow skirt portion 12 at a point below the one end.

It is also possible to have the plurality of apertures 26 in the at least one annular compression ring groove 20 formed through the sidewall 13 of the piston 10 at an angle and in which case a portion of one end of the aperture 26 will terminate at the bottom land 32 of the rectangular groove and the remaining portion of the one end will terminate at the back wall 28 of the rectangular groove 20 and the other end of the aperture 26 will terminate at the inner surface 30 of the hollow skirt portion 12 at a point below the one end.

In the presently contemplated preferred embodiment, the piston 10 further comprises a second annular compression ring groove 21 formed in the outer sidewall 13 of the piston 10 intermediate the at least one annular compression ring groove 20 and the head portion 16 for receiving and retaining therein a second compression ring.

The second annular compression ring groove 21 further comprises at least one aperture 27 disposed in fluid communication with the interior of the hollow skirt portion 12 for communicating such lubricating agent gathered in the second annular compression ring groove 21 into the interior of the hollow skirt portion 12.

The second annular compression ring groove 21 has a cross-sectional area that is also substantially rectangular and the at least one aperture 27 in said second annular compression ring groove 21 is formed through the sidewall of the piston 10 at an angle. One end of said aperture 27 terminates at the bottom wall or land 32 of the rectangular groove 21 and the other end terminates at the inner surface 30 of the hollow skirt portion 12 at a point below said one end.

It is preferred that the second annular compression ring groove 21 will have a plurality of apertures 27 disposed in such fluid communication with the interior of the hollow skirt portion 12.

The piston 10 may also further comprise a second annular lubricating groove 23 formed in the outer sidewall 13 of said piston 10 adjacent the open end 14 of the hollow skirt portion 12 for receiving and retaining therein a second lubricating ring.

The second annular lubricating groove 23 has a cross-sectional area that is substantially rectangular and further comprises a plurality of apertures 32 disposed in fluid communication with the interior of the hollow skirt portion for communicating such lubricating agent gathered in the second annular lubricating groove 23 into the interior of the hollow skirt portion 12.

The plurality of apertures 32 in the second annular lubricating groove 23 are formed through the sidewall of the piston 10 substantially perpendicular to a longitudinal center line of the piston 10 and one end of the apertures 32 terminates at the back wall of the rectangular groove 23 and the other end terminates at the inner surface 30 of the hollow skirt portion 12.

The plurality of apertures 26 in the at least one annular compression ring groove 21 have a cross-sectional area that is generally round and the diameter of the apertures 26 is between about 1/16 inch and about 3/16 inch.

The plurality of apertures 27 in the second annular compression ring groove 20 have a cross-sectional area that is generally round and the diameter of the apertures 27 is between about 1/16 inch and 3/16 inch.

Table I shows the results from a series of tests run on a compressor exhauster piston without the invention.

TABLE I

| | | Compressor Exhauster | | | |
|---|---|---|---|---|---|
| | | Compressor Cycling 125–140 psig | | 50 Percent Cycle | |
| Test No. | Total Test Hours | RPM | Reservoir Vacuum "Hg. | Crankcase Vacuum "Hg | Oil Passing Rate cc/hr. | Remarks |
| 1 | 427 | 1050 & 750 | 28 | 18.7 | 9.367 | Speed alternated 750 to 1050 |
| 2 | 300 | 1050 & 750 | 20 | 18.7 | 56.67 | Compresor ran out of oil |
| 3 | 330 | 750 | 15 | 16.9 | 52.12 | Compressor ran out of oil |
| 4 | 280 | 630 | 10 | 12.6 | 60.71 | Compressor ran out of oil |
| 5 | 192 | 630 | 0 | 4.3 | 79.06 | |
| 6 | 168 | 750 | 20 | 18.7 | 30.65 | |

The above test results show that the compressor exhauster that was tested was an excessive oil passer whose oil passing rate increased with a decrease in main reservoir vacuum even under conditions when the crankcase vacuum was maintained at 18.7 inches Hg.

The inspection of vacuum cylinders in current production tests also show that an excessive amount of oil is being carried past the rings to the top of the piston. Large puddles of oil are visible on top of the vacuum pistons in these machines. This suggests that all oil being passed does not pass by the sealing surface of the ring but possibly migrates behind the rings until it enters the top of the piston and is forced out through the valves to atmosphere. In any event, the characteristically high oil passage on vacuum cylinders acts to increase maintenance requirements because of theoil carboning the valves under high discharge temperature conditions. Valve cleaning periods have sometimes been reported as short as three months.

Table II shows the results from a series of oil passing tests conducted on a Compressor Exhauster with Vacuum Pistons, according to the invention, having ten (10) ⅛" diameter holes in the bottom compression ring groove and six (6) ⅛" diameter holes in the top compression ring groove. The object of these tests was to determine if modification to the vacuum pistons alone would provide the desired improvement in oil passage without adversely affecting the basic operation of the compressor exhauster.

TABLE II

Compressor Exhauster
Compressor Cycling 125–140 psig, 50 Percent Cycle.
Vacuum Pistons modified by adding (10) ⅛" diameter
holes to the bottom compression ring groove and (6) ⅛"
diameter holes to the top compression ring groove.

| Test No. | Total Test Hours | RPM | Main Reservoir Vacuum "Hg. | Crankcase Vacuum "Hg. | Oil Passing Rate cc/hr. |
|---|---|---|---|---|---|
| 1 | 912 | 540 | 23* | — | 4.76 |
| 2 | 912 | 540 | 20* | 12 | 3.16 |
| 3 | 912 | 540 | 10* | 11 | 3.618 |
| 4 | 501 | 540 | 7 | 2 | 5.389 |
| 5 | 532 | 600 | 7 | 2 | 7.246 |
| 6 | 504 | 600 | 10 | 4 | 5.297 |
| 7 | 504 | 630 | 15 | 7 | 5.406 |
| 8 | 504 | 630 | 20 | 10 | 2.976 |

*Globe Valve to Vacuum Reservoir was vibrating closed.

As is readily apparent, under the various operating conditions tested, oil passing for the modified piston ranged from a minimum of 2.976 cc/hr. to a maximum of 7.246 cc/hr., thus indicating a substantial improvement when compared to typical values for compressor exhausters as shown in Table I.

Inspection of the Compressor Exhauster operating with the modified pistons showed the complete absence of carboning normally associated with the vacuum heads.

Table III shows the results from another series of oil passing tests that were conducted on an Air Compressor with modified low pressure pistons, according to the invention, having ten (10) holes in only the bottom compression ring groove. The object of these tests was to investigate the feasibility of incorporating oil retrieval holes in low pressure pistons of air compressors since this would permit standardization of the oil retrieval holes in all aluminum pistons. Only the bottom compression ring groove was drilled so as to limit blow-by in the compressor cylinders.

TABLE III

Air Compressor
Low pressure pistons modified by adding (10) ⅛"
diameter holes to the bottom compression ring groove.
1/64" diameter spit holes in all rods.
Tuthill gear driven oil pump.

| Test No. | Total Test Hours | RPM | Crankcase Vacuum "H₂O | Oil Passing Rate cc/hr. |
|---|---|---|---|---|
| 1 | 502 | 750 | 16 | 2.29 |
| 2 | 500 | 750 | 16 | 2.0 |
| 3 | 500 | 750 | 16 | 1.3 |
| 4 | 505 | 750 | 16 | 2.18 |
| 5 | 648 | 750 | 14 | 2.90 |
| 6 | 504 | 750 | 15 | 2.36 |
| 7 | 504 | 750 | 16 | 2.98 |
| 8 | 647 | 750 | 11 | .966 |
| 9 | 534 | 750 | 11.5 | 1.75 |
| 10 | 500 | 1000 | 30 | 4.6 |

All tests were conducted at 750 rpm with crankcase vacuum ranging from 3.0 to 16.0 inches of water. Oil passing ranged from a minimum of 0.966 cc/hr. to a maximum of 4.6 cc/hr.

This represents an improvement in oil passing since the standard 3CDCL Air Compressor normally passes from 5.0 to 10.0 cc/hr. at 500 rpm to 1000 rpm, respectively. No detrimental effects of the oil retrieval holes were observed during this series of tests either in terms of compressor operation or its condition upon inspection after completion of the tests.

Table IV shows the results of a third series of oil passing tests that were conducted on a Compressor Exhauster with modified vacuum pistons having ten (10) ⅛" diameter holes in only the bottom compression ring groove. The purpose of these tests was to determine if a significant improvement in oil passing reduction could be achieved on compressor-exhausters when using aluminum pistons that could be adapted to both compressors and compressor exhausters.

TABLE IV

Compressor Exhauster
Compressor Cycling 125–140 psig, 50 Percent Cycle
(10) ⅛" diameter holes in the lower compression ring groove

| Test No. | Total Test Hours | RPM | Main Reservoir Vacuum "Hg. | Crankcase Vacuum "Hg. | Oil Passing Rate cc/hr. |
|---|---|---|---|---|---|
| 1 | 502 | 650 | 4 | 10 | 34.073 |
| 2 | 635 | 650 | 15 | 16.5 | 18.22 |
| 3 | 528 | 650 | 25 | 18.5 | 13.787 |
| 4 | 504 | 650 | 25 | 18 | 17.857 |
| 5 | 500 | 540 | 20 | 18 | 10.51 |

These results indicate that, although a considerable reduction in oil passing can be obtained with oil retrieval holes in only the bottom compression ring groove, the degree of improvement is less than what can be obtained when both compression ring grooves are modified.

It can therefore be seen that a significant improvement in oil passing characteristics and valve maintenance requirements of the Compressor Exhausters may be made available through modification of both the vacuum pistons and the low pressure piston to incorporate oil retrieval holes in only the bottom compression ring groove.

Although both the presently preferred and various alternative embodiments have been described, other modifications and adaptations may be made by persons skilled in the art without departing from the spirit and scope of the appended claims.

Having now described the invention, what I claim as new and desire to secure by Letters Patent, is:

1. A piston assembly for reciprocal movement within a bore of an operating air compressor which bore in combination with such piston assembly forms a variable volume air pressure chamber of said operating air compressor, said air compressor piston assembly comprising:
   (a) a piston having a head portion disposed at one end of said piston to form a boundary of such variable volume air chamber and a hollow skirt portion adjacent said head portion for maintaining said piston assembly in substantial axial alignment with an interior sidewall of such bore of said operating air compressor during reciprocal movement of said piston assembly, said head portion and said skirt portion of said piston being formed from a single piece;
   (b) a pair of wrist pin connecting means formed on diametrically opposed sides of said interior sidewall of said hollow skirt portion for connecting said piston assembly to a connecting rod of said air compressor;
   (c) at least two annular lubricating ring grooves formed in an outer sidewall of said piston, a first of said annular lubricating ring grooves formed intermediate said head portion and an upper surface of said wrist pin connecting means and a second of said annular lubricating ring grooves formed adjacent an open end of said hollow skirt portion, each of said at least two lubricating ring grooves provided to receive and retain therein a lubrication control ring;

(d) each of said at least two annular lubricating ring grooves having at least one aperture disposed in fluid communication with an interior surface of said hollow skirt portion for communicating such lubricating agent gathered in each of said at least two lubricating grooves into said interior of said hollow skirt portion so that such lubricating agent can return to a crankcase of said operating air compressor through said open end of said hollow skirt portion of said piston;

(e) at least two annular compression ring grooves formed in said outer sidewall of said piston, each of said compression ring grooves being disposed intermediate said first of said at least two annular lubricating grooves and said head portion, each of said compression ring grooves provided to receive and retain therein a compression ring;

(f) a compression ring disposed in each of said at least two annular compression ring grooves for sealing said piston assembly against said interior sidewall of said bore during such reciprocal movement of said piston; and (g) at least one of said compression ring grooves having at least one aperture disposed in fluid communication with said interior of said hollow skirt portion for communicating such lubricating agent gathered in said at least one compression ring groove into said interior of said hollow skirt portion so that such lubricating agent can return to said crankcase of said operating air compressor through said open end of said hollow skirt portion of said piston.

2. A piston assembly, according to claim 1, wherein said at least one aperture in each of said at least two annular lubricating ring grooves and said at least one of said annular compression ring grooves is positioned in a first longitudinal plane which is substantially perpendicular to and centrally located between the ends of a second longitudinal plane which intersects a center line of said wrist pin connecting means.

3. A piston assembly, according to claim 2, wherein said at least one of said annular compression ring grooves further includes at least three apertures on opposed sides of said second longitudinal plane and wherein a center aperture on each side is positioned on said first longitudinal plane and the two outer apertures are positioned substantially equidistant from said center aperture on said each side.

4. A piston assembly, according to claim 2, wherein said at least one of said annular compression ring grooves further includes a plurality of apertures and wherein a greater number of said plurality of apertures are positioned on a first side of said second longitudinal plane which intersects said center line of said wrist pin connecting means than on an opposed second side of said longitudinal plane and wherein said greater number of apertures are spaced substantially equidistant from each other.

5. A piston assembly, according to claim 1, wherein each of said at least two annular lubricating ring grooves and said at least two annular compression ring grooves have a cross-sectional area that is substantially rectangular and wherein a back wall of said rectangular groove is substantially parallel to said outer sidewall of said piston and wherein said aperture in said at least one of said annular compression ring grooves is formed through said sidewll of said piston substantially perpendicular to a longitudinal plane which intersects a center line of said wrist pin connecting means and wherein one end of said aperture terminates at an inner surface of said hollow skirt.

6. A piston assembly, according to claim 3, wherein said plurality of apertures in said at leaast one of said annular compression ring grooves are formed through said sidewall of said piston at an angle and wherein a first end of said apertures terminates at a bottom wall of said rectangular groove and a second end terminates at an inner surface of said hollow skirt portion at a point below said first end.

7. A piston assembly, according to claim 3, wherein said plurality of apertures in said at least one of said annular compression ring grooves are formed through said sidewall of said piston at an angle and wherein a first portion of a first end of said aperture terminates at a bottom wall of said rectangular groove and a second portion of said first end terminates at a back wall of said rectangular groove and a second end of said aperture terminates at an inner surface of said hollow skirt portion at a point below said first end.

8. A piston assembly, according to claim 1, wherein each of said at least two annular compression ring grooves include at least one aperture disposed in fluid communication with said interior of said hollow skirt portion for communicating such lubricating agent gathered in each of said at least two annular compression ring grooves into said interior of said hollow skirt portion.

9. A piston assembly, according to claim 8, wherein each of said at least two annular compression ring grooves have a cross-sectional area that is substantially rectangular and wherein said at least one aperture in each of said at least two annular compression ring grooves is formed through said sidewall of said piston at an angle and wherein a first end of said aperture terminates at a bottom wall of said rectangular groove and a second end terminates at an inner surface of said hollow skirt portion at a point below said first end.

10. A piston assembly, according to claim 9, wherein each of said at least two annular compression ring grooves have a plurality of apertures disposed in fluid communication with said interior of said hollow skirt portion.

11. A piston assembly, according to claim 10, wherein said plurality of apertures in each of said at least two annular compression ring grooves have a cross-sectional area that is generally round and wherein a diameter of said apertures is between about 1/16 inch and about 3/16 inch.

12. A piston assembly for reciprocal movement within a vertical bore of an operating air compressor which vertical bore in combination with said piston assembly forms a variable volume air pressure chamber of said operating air compressor, said piston assembly comprising:

(a) a piston having a head portion disposed at one end of said piston to forma boundary of such variable volume air chamber and a hollow skirt portion adjacent said head portion for maintaining said piston assembly in substantial axial alignment with an interior sidewall of such vertical bore of said operating air compressor during reciprocal movement of said piston assembly, said head portion and said skirt portion of said piston being formed from a single piece;

(b) a pair of wrist pin connecting means formed on diametrically opposed sides of said interior sidewall of said hollow skirt portion for connecting said piston assembly to a connecting rod of said air compressor;

(c) at least two annular lubricating ring grooves formed in an outer sidewall of said piston, a first of said annular lubricating ring grooves formed intermediate said head portion and an upper surface of said wrist pin connecting means and a second of said annular lubricating ring grooves formed adjacent an open end of said hollow skirt portion, each of said lubricating ring grooves provided to receive and retain therein a lubrication control ring;

(d) said at least two annular lubricating ring grooves having at least one aperture disposed in fluid communication with an interior surface of said hollow skirt portion for communicating such lubricating agent gathered in each of said at least two lubricating grooves into said interior of said hollow skirt portion so that such lubricating agent can return to a crankcase of said operating air compressor through said open end of said hollow skirt portion of said piston;

(e) at least one annular compression ring groove formed in said outer sidewall of said piston intermediate said first annular lubricating groove and said head portion for receiving and retaining therein a compression ring;

(f) a compression ring disposed in said at least one annular compression ring groove for sealing said piston assembly against such interior sidewall of said vertical bore; and (g) said at least one compression ring groove having a plurality of apertures disposed in fluid communication with said interior of said hollow skirt portion for communicating such lubricating agent gathered in said at least one compression ring groove into said interior of said hollow skirt portions so that such lubricating agent can return to such crankcase of said operating air compressor through said open end of said hollow skirt portion of said piston, said plurality of apertures being divided equally between each side of a second longitudinal plane which intersects a center line of said wrist pin connecting means.

13. A piston assembly, according to claim 12, wherein said at least one aperture in each of said at least two annular lubricating ring grooves and at least two of said plurality of apertures in said annular compression ring groove are positioned in a first longitudinal plane which is substantially perpendicular to and centrally located between the ends of a second longitudinal plane which intersects said center line of said wrist pin connecting means.

14. A piston assembly, according to claim 13, wherein said at least one annular compression ring groove further includes at least three apertures on each side of said second longitudinal plane and wherein a center aperture on said each side is positioned on said first longitudinal plane and all remaining apertures are positioned substantially equidistant from said center aperture on said each side.

15. A piston assembly, according to claim 13, wherein each of said at least two annular lubricating ring grooves and said at least one annular compression ring groove have a cross-sectional area that is substantially rectangular and wherein a back wall of said rectangular groove is substantially parallel to said outer sidewall of said piston and wherein said plurality of apertures in said at least one annular compression ring groove are formed thrugh said sidewall of said piston substantially perpendicular to a longitudinal plane which intersects said center line of said wrist pin connecting means and wherein one end of said apertures terminates at said inner surface of said hollow skirt.

16. A piston assembly, according to claim 14, wherein each of said at least two annular lubricating ring grooves and said at least one annular compression ring groove have a cross-sectioned area that is substantially rectangular and wherein said plurality of apertures in said at least one annular compression ring groove are formed through said sidewall of said piston at an angle and wherein a first end of said apertures tereminates at a bottom wall of said rectangular groove and a second end terminates at said inner surface of said hollow skirt portion at a point below said first end.

17. A piston assembly, according to claim 14, wherein each of said at least two annular lubricating ring grooves and said at least one annular compression ring groove have a cross-sectioned area that is substantially rectangular and wherein said plurality of apertures in said at least one annular compression ring groove are formed through said sidewall of said piston at an angle and wherein a portion of a first end of said aperture terminates at a bottom wall of said rectangular groove and a remaining portion of said first end terminates at a back wall of said rectangular groove and a second end of said aperture terminates at said inner surface of said hollow skirt portion at a point below said first end.

18. A piston assembly, according to claim 12, wherein said piston further includes a second annular compression ring groove formed in said outer sidewall of said piston intermediate said at least one annular compression ring groove and said head portion for receiving and retaining therein a second compression ring.

19. A piston assembly, according to claim 18, wherein said second annular compression ring groove further includes at least one aperture disposed in fluid communication with said interior of said hollow skirt portion for communicating such lubricating agent gathered in said second annular compression ring groove into said interior of said hollow skirt portion.

20. A piston assembly, according to claim 17, wherein said second annular compression ring groove has a cross-sectional area that is substantially rectangular and wherein said at least one aperture in said second annular compression ring groove is formed through said sidewall of said piston at an angle and wherein a first end of said aperture terminates at a bottom wall of said rectangular groove and a second end terminates at an inner surface of said hollow skirt portion at a point below said first end.

21. A piston assembly, according to claim 20, wherein said second annular compression ring groove has a plurality of apertures disposed in fluid communication with said interior of said hollow skirt portion.

22. A piston assembly, according to claim 14, wherein said plurality of apertures in said at least one annular compression ring groove have a cross-sectional area that is generally round and wherein the diameter of said apertures is between about 1/16 inch and about 3/16 inch.

23. A piston assembly, according to claim 21, wherein said plurality of apertures in said second annular compression ring groove have a cross-sectional area that is generally round and wherein the diameter of said aperture is between about 1/16 inch and 3/16 inch.

24. A piston assembly for reciprocal movement within a slanted bore of an operating air compressor which slanted bore in combination with such piston assembly forms a variable volume air pressure chamber of said operating air compressor, said piston assembly comprising:

(a) a piston having a head portion disposed at one end of said piston to form a boundary of such variable volume air chamber and a hollow skirt portion adjacent said head portion for maintaining said piston assembly in substantial axial alignment with an interior sidewall of said slanted bore of said operating air compressor during reciprocal movement of said piston assembly, said head portion and said skirt portion of said piston being formed from a single piece;

(b) a pair of diametrically opposed wrist pin connecting means formed on said interior sidewall of said hollow skirt portion for connecting said piston assembly to a connecting rod of said air compressor;

(c) at least two annular lubricating ring grooves formed in an outer sidewall of said piston, a first of said annular lubricating ring grooves formed intermediate said head portion and an upper surface of said wrist pin connecting means and a second of said annular lubricating ring grooves formed adjacent an open end of said hollow skirt portion, each of said lubricating ring grooves provided to receive and retain therein a lubrication control ring;

(d) said at least two annular lubricating ring grooves having at least one aperture disposed in fluid communication with said interior sidewall of said hollow skirt portion along a lower portion of said lubricating ring groove for communicating such lubricating agent gathered in said at least two lubricating ring grooves into said interior of said hollow skirt portion so that such lubricating agent can return to a crankcase of such operating mechanism through said open end of said hollow skirt portion of said piston;

(e) at least one annular compression ring groove formed in said outer sidewall of said piston intermediate said first annular lubricating groove and said head portion for receiving and retaining therein a compression ring;

(f) a compression ring disposed in said at least one annular compression ring groove for sealing said piston assembly against said interior sidewall of said slanted bore; and (g) said at least one compression ring groove having at least one aperture disposed in fluid communication with said interior of said hollow skirt portion along a lower portion of said compression ring groove for communicating such lubricating agent gathered in said at least one compression ring groove into said interior of said hollow skirt portion so that such lubricating agent can return to a crankcase of said operating air compressor through said open lend of said hollow skirt portion of said piston.

25. A piston assembly, according to claim 24, wherein said at least one aperture in each of said at least two annular lubricating ring grooves and said at least one annular compression ring groove is positioned in a first longitudinal plane which is substantially perpendicular to and centrally located between the ends of a second longitudinal plane which intersects said center line of said wrist pin connecting means.

26. A piston assembly, according to claim 25, wherein said at least one annular compression ring groove further includes at least three apertures on each side of said second longitudinal plane and wherein a center aperture on each side is positioned on said first longitudinal plane and all remaining apertures are positioned substantially equidistant from said center aperture on said each side.

27. A piston assembly, according to claim 25, wherein said at least one annular compression ring groove further includes a plurality of apertures and wherein a greater number of said plurality of apertures are positioned on said lower portion of said compression ring groove and wherein said greater number of apertrues are spaced substantially equidistant from each other.

* * * * *

UNITED STATES PATENT AND TRADEMARK OFFICE
CERTIFICATE OF CORRECTION

PATENT NO. : 4,836,093
DATED : June 6, 1989
INVENTOR(S) : Daniel G. Wagner

It is certified that error appears in the above-identified patent and that said Letters Patent is hereby corrected as shown below:

Column 1, line 58, delete "ol" and insert --oil--

Column 3, line 44, after "sidewall" insert -- . --

Column 4, line 9, delete "are" and insert --or-- same line, delete "preferrably" and insert --preferably-- line 47, delete "rins" and insert --rings--

Column 6, line 55, delete "theoil" and insert --the oil--

Column 10, line 13, delete "leaast" and insert --least-- line 66, delete "forma" and insert --form a--

Column 11, line 46-47, delete "por-tions" and insert --portion--

Column 12, line 11, delete "thrugh" and insert --through-- line 23, delete "tereminates" and insert --terminates-- line 53, delete "17" and insert --19--

Column 13, line 8-9, delete "aper-ture" and insert --apertures--

UNITED STATES PATENT AND TRADEMARK OFFICE
CERTIFICATE OF CORRECTION

PATENT NO.   :   4,836,093

DATED        :   June 6, 1989

INVENTOR(S)  :   Daniel G. Wagner

It is certified that error appears in the above-identified patent and that said Letters Patent is hereby corrected as shown below:

Column 14, line 23, delete "lend" and insert --end-- line 45, delete "apertrues" and insert --apertures--

Signed and Sealed this

Fourth Day of September, 1990

Attest:

HARRY F. MANBECK, JR.

*Attesting Officer*          *Commissioner of Patents and Trademarks*